(12) United States Patent
Punke et al.

(10) Patent No.: US 8,858,904 B2
(45) Date of Patent: Oct. 14, 2014

(54) CATALYZED SOOT FILTER

(75) Inventors: Alfred Helmut Punke, Walle (DE);
Gerd Grubert, Hannover (DE); Yuejin Li, Edison, NJ (US); Ruediger Wolff, Nienburg (DE); Stanley Roth, Yardley, PA (US); Torsten Müller-Stach, Hannover (DE); Attilio Siani, Hannover (DE); Kenneth Voss, Somerville, NJ (US); Torsten Neubauer, Langenhagen (DE)

(73) Assignee: BASF Corporation, Florham Park, NJ (US)

(*) Notice: Subject to any disclaimer, the term of this patent is extended or adjusted under 35 U.S.C. 154(b) by 488 days.

(21) Appl. No.: 13/031,808

(22) Filed: Feb. 22, 2011

(65) Prior Publication Data

US 2011/0212008 A1 Sep. 1, 2011

Related U.S. Application Data

(60) Provisional application No. 61/306,960, filed on Feb. 23, 2010.

(51) Int. Cl.
*B01D 53/56* (2006.01)
*B01D 53/94* (2006.01)
(Continued)

(52) U.S. Cl.
CPC ............. *B01D 53/9468* (2013.01); *F01N 3/103* (2013.01); *B01D 2255/1021* (2013.01);
(Continued)

(58) Field of Classification Search
USPC ......... 502/258–263, 304, 327, 332–334, 339, 502/349–350, 355, 415, 439, 527.12, 502/527.13, 527.18, 527.19; 423/213.5; 422/177
See application file for complete search history.

(56) References Cited

U.S. PATENT DOCUMENTS

| 4,727,052 A | 2/1988 | Wan et al. |
| 4,961,917 A | 10/1990 | Byrne |

(Continued)

FOREIGN PATENT DOCUMENTS

| CN | 2721206 | 8/2005 |
| DE | 10-2004-04054 9 | 2/2006 |

(Continued)

OTHER PUBLICATIONS

PCT International Search Report for PCT/IB2011/050732, Jun. 16, 2011, 4 pages.

(Continued)

*Primary Examiner* — Cam N. Nguyen
(74) *Attorney, Agent, or Firm* — Melanie L. Brown

(57) ABSTRACT

Described is a catalyzed soot filter wherein the inlet coating of the filter comprises an oxidation catalyst comprising platinum (Pt) and optionally palladium (Pd), wherein the outlet coating of the filter comprises an oxidation catalyst comprising Pd and optionally Pt, wherein the Pt concentration in the outlet coating is lower than the Pt concentration in the inlet coating and wherein the weight ratio of Pt:Pd in the outlet coating is in the range of from 0:1 to 2:1; and wherein the inlet coating and the outlet coating are present on the wall flow substrate at a coating loading ratio in the range of from 0.5 to 1.5, calculated as ratio of the loading of the inlet coating (in g/inch$^3$ (g/(2.54 cm)$^3$)):loading of the outlet coating (in g/inch$^3$ (g/(2.54 cm)$^3$)). Systems include such catalyzed soot filters, methods of diesel engine exhaust gas treatment and methods of manufacturing catalyzed soot filters are also described.

24 Claims, 4 Drawing Sheets

(51) Int. Cl.
*B01J 8/02* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)
*B01D 50/00* (2006.01)
*B01D 53/34* (2006.01)
*B01J 23/00* (2006.01)
*B01J 21/00* (2006.01)
*F01N 3/035* (2006.01)
*F01N 3/10* (2006.01)
*F01N 13/02* (2010.01)

(52) U.S. Cl.
CPC ......... *F01N 3/035* (2013.01); *F01N 2510/0682* (2013.01); *F01N 2013/023* (2013.01); *F01N 2013/026* (2013.01); *B01D 2255/1023* (2013.01); *B01D 2258/012* (2013.01); *B01D 2255/9155* (2013.01); *B01D 53/944* (2013.01); *Y10S 502/52712* (2013.01); *Y10S 502/52713* (2013.01); *Y10S 502/52718* (2013.01); *Y10S 502/52719* (2013.01)
USPC ........ 423/213.5; 422/177; 502/258; 502/259; 502/260; 502/261; 502/262; 502/263; 502/304; 502/327; 502/332; 502/333; 502/334; 502/339; 502/349; 502/350; 502/355; 502/415; 502/439; 502/527.12; 502/527.13; 502/527.18; 502/527.19

(56) References Cited

U.S. PATENT DOCUMENTS

| | | | |
|---|---|---|---|
| 5,516,497 | A | 5/1996 | Speronello et al. |
| 7,576,031 | B2 * | 8/2009 | Beutel et al. .................. 502/339 |
| 7,722,829 | B2 * | 5/2010 | Punke et al. .................. 422/180 |
| 7,875,573 | B2 * | 1/2011 | Beutel et al. .................. 502/339 |
| 7,977,275 | B2 | 7/2011 | Pfeifer et al. |
| 8,039,954 | B2 * | 10/2011 | Osawa et al. .................. 257/723 |
| 8,220,251 | B2 * | 7/2012 | Oger et al. ...................... 60/286 |
| 8,409,515 | B2 * | 4/2013 | Ren et al. ...................... 422/171 |
| 2008/0045405 | A1 | 2/2008 | Beutel et al. |
| 2008/0141661 | A1 | 6/2008 | Voss et al. |
| 2009/0208394 | A1 * | 8/2009 | Li .............................. 423/213.2 |
| 2009/0288402 | A1 | 11/2009 | Voss et al. |
| 2011/0030346 | A1 * | 2/2011 | Neubauer et al. ............... 60/274 |

FOREIGN PATENT DOCUMENTS

| | | |
|---|---|---|
| EP | 1541219 | 6/2005 |
| EP | 1657410 | 5/2006 |
| EP | 1837076 | 9/2007 |
| JP | 2008-151100 | 7/2008 |
| WO | WO-2011/061321 | 5/2011 |

OTHER PUBLICATIONS

PCT International Preliminary Report on Patentability in PCT/IB2011/050732, mailed Sep. 7, 2012, 7 pgs.
Johansen, Keld et al., "Novel Base Metal-Palladium Catalytic Diesel Filter Coating with NO2 Reducing Properties", 2007, 9.
Extended European Search Report in EP11746943, dated Aug. 5, 2014, 6 pages.

* cited by examiner

CATALYZED SOOT FILTER

CROSS-REFERENCE TO RELATED APPLICATIONS

This application claims the benefit of priority under 35 U.S.C. §119(e) to U.S. Patent Application No. 61/306,960, filed Feb. 23, 2010, which is hereby incorporated by reference in its entirety.

TECHNICAL FIELD

The present invention relates to a catalyzed soot filter, in particular for the treatment of Diesel engine exhaust, with a zoned design which ensures soot particulates filtration, assists the oxidation of carbon monoxide, and produces low $NO_2$ emissions during normal engine operations and active regeneration events.

BACKGROUND

Diesel engine exhaust is a heterogeneous mixture which contains not only gaseous emissions such as carbon monoxide ("CO"), unburned hydrocarbons ("HC") and nitrogen oxides ("NOx"), but also condensed phase materials, i.e. liquids and solids, which constitute the so-called particulates or particulate matter. Emissions treatment systems for diesel engines must treat all of the components of the exhaust to meet the emission standards set by the various regulatory agencies throughout the world.

The total particulate matter emissions of diesel exhaust contain three main components. One component is the solid, dry, solid carbonaceous fraction or soot fraction. This dry carbonaceous fraction contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction, which is formed from small quantities of sulfur components present in the diesel fuel.

Catalyst compositions and substrates on which the compositions are disposed are typically provided in diesel engine exhaust systems to convert certain or all of these exhaust components to innocuous components. For instance, oxidation catalysts that contain platinum group metals, base metals and combinations thereof, facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g., honeycomb flow through monolith substrates), which are placed in the exhaust of diesel engines to treat the exhaust before it vents to the atmosphere. Certain oxidation catalysts also promote the oxidation of NO to NO2.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust.

Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as O2 or NO2 to combust the particulate matter.

Passive regeneration processes combust the particulate matter at temperatures within the normal operating range of the diesel exhaust system. Specifically, the oxidant used in the regeneration process is NO2 since the soot fraction combusts at much lower temperatures than those needed when O2 serves as the oxidant. While O2 is readily available from the atmosphere, NO2 can be actively generated though the use of upstream oxidation catalysts that oxidizes NO in the exhaust stream.

In spite of the presence of the catalyst compositions and provisions for using NO2 as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to 570-630° C.

During the passive regeneration on current state of the art catalyzed soot filter, the NO2 consumed during the oxidation of soot can be produced again by the catalyst assisted oxidation of NO along the channel of the catalyzed soot filter. In order to provide sufficient NO2 to oxidize soot and avoid frequent active soot regenerations, Pt-rich washcoats have been applied on the soot filter material. However, such Pt-rich washcoats raise concerns due to risk of producing a high amount of NO2 which would exit the catalyzed soot filter without being used for the oxidation of soot. The NO2 exiting the catalyzed soot filter can be emitted in the atmosphere only if its concentration fulfills the requirements of the air regulation limits, otherwise its concentration has to be reduced or the NO2 converted by means of further downstream catalysts such as NOx traps and/or catalysts able to selectively reduce NOx in presence of urea, ammonia or hydrocarbons. The need of abating the NO2 emission is not only limited to the normal operation of a diesel engine but also during the so called active regenerations. In fact, during the high temperature oxidation of soot by oxygen, NO2 produced on the Pt-rich washcoat can not be fully consumed by reaction with soot.

EP-A-1 541 219 discloses a catalyzed soot filter which would simultaneously remove soot and NOx that is achieved with a combination of NOx storage catalysts on the soot filter. This solution has however disadvantages because requires additionally the use of another precious metal e.g. Ag and/or base metal oxides for the storage and conversion and/or release of NOx or to limit the NO2 conversion which not only add complexity and increase costs but also lead to a more sulfur sensitive system. In fact, the sulfur present in the commercially available diesel fuel could poison the activity of Ag, therefore forcing the system to be more frequently regenerated and thus to have a higher fuel penalty.

EP 1 837 076 A1 and JSAE 20077233 disclose a catalyzed soot filter formulation which suppresses the NO2 formation during active filter regeneration as well as during normal diesel engine operation. Such suppression is achieved by the use of mixed base metal oxides e.g. Cu, La—Cu, Co and Fe oxides comprised in a PGM containing washcoat. Also in this case, the disadvantages come from the use of such base metal oxides which render the system more sulfur sensitive or less able to fully oxidize CO and HC.

Alternative methods to remove soot and NOx during the engine operation rely on the used of the so called SCR (selective catalytic reduction) catalysts, which could be separated from the soot filter or integrated into it. In both cases, these methods do not provide solutions an optimal solution which could be widely applied. In fact, while separating the SCR catalysts and the catalyzed soot filters could be advantageous to specifically address the abatements of discrete components in the exhaust system, the increased cost, need of reductant and increased volume of such a system limits its applicability. On the other side, when the SCR catalyst is implemented into to catalyzed soot filter, although the system volume is reduced, there is an increased risk of having unacceptably high back pressure in the exhaust line as well as still the need of a reductant to be injected into the system.

An improved catalyzed soot filter which ensures oxidation of soot via NO2 during normal diesel engine operation and also suppresses the NO2 formation reaction during active regeneration is desired. It may also be desirable to provide a catalyzed soot filter which ensures that the concentration of unconverted NO2 exiting the catalyzed soot filter is as low as possible in order to fulfill the air regulation limits, specifically without the need of an additional NOx reduction system. Thus, the catalyzed soot filter should provide an economically more favorable NO2 abatement. Additionally, it may be desirable to provide a catalyzed soot filter which, apart from controlling the NO2 formation reaction, continually supports the oxidation and abatement of CO and unburned HC—and thus allows for a minimum breakthrough of HC and CO—as well as maintains its soot filtration capabilities. It may also be desirable to provide a catalyzed soot filter which, due to the rarity and consequently costs of precious metal components usually used for the preparation of catalyzed soot filters, contains a reduced amount of platinum in the catalyst composition allowing for reduced costs for the catalyzed soot filter without reducing the filter efficiency.

SUMMARY

Provided is a catalyzed soot filter, comprising a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein the internal walls of the inlet passages comprise an inlet coating that extends from the inlet end to an inlet coating end, thereby defining an inlet coating length, wherein the inlet coating length is x % of the substrate axial length, with $0 < x \leq 80$;

wherein the internal walls of the outlet passages comprise an outlet coating that extends from the outlet end to an outlet coating end, thereby defining an outlet coating length, wherein the outlet coating length is 100-x % of the substrate axial length;

wherein the inlet coating length defines an upstream zone of the catalyzed soot filter and the outlet coating length defines a downstream zone of the catalyzed soot filter;

wherein the inlet coating comprises an oxidation catalyst comprising platinum (Pt) and optionally palladium (Pd);

wherein the outlet coating comprises an oxidation catalyst comprising Pd and optionally Pt, wherein the Pt concentration in the outlet coating is lower than the Pt concentration in the inlet coating and wherein the weight ratio of Pt:Pd in the outlet coating is in the range of from 0:1 to 2:1;

wherein the inlet coating and the outlet coating are present on the wall flow substrate at a coating loading ratio in the range of from 0.5 to 1.5, calculated as ratio of the loading of the inlet coating (in $g/inch^3$ ($g/(2.54\ cm)^3$)):loading of the outlet coating (in $g/inch^3$ ($g/(2.54\ cm)^3$)).

Further provided is a process for manufacturing such catalyzed soot filter, comprising (i) providing a wall flow substrate, specifically having a porosity in the range of from 38 to 75, determined according to mercury porosity measurement according to DIN 66133, wherein the wall flow substrate is specifically a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;

wherein the plurality of passages comprise inlet passages having an open inlet end and a closed outlet end, and outlet passages having a closed inlet end and an open outlet end;

(ii) applying an inlet coating to the internal walls of the inlet passages such that the inlet coating extends from the inlet end to an inlet coating end whereby an inlet coating length is defined, wherein the inlet coating length is x % of the substrate axial length with $0 < x \leq 80$, thereby adjusting the loading of the inlet coating to a predetermined value which is specifically in the range of from 0.05 to 1 $g/inch^3$ ($g/(2.54\ cm)^3$), said inlet coating comprising an oxidation catalyst comprising platinum (Pt) and optionally palladium (Pd);

(iii) before (ii) or simultaneously with (ii) or after (iii), applying an outlet coating to the internal walls of the outlet passages such that the outlet coating extends from the outlet end to an outlet coating end whereby an outlet coating length is defined, wherein the outlet coating length is 100-x % of the substrate axial length, thereby adjusting the loading of the outlet coating to a predetermined value which is specifically in the range of from 0.05 to 1 $g/inch^3$ (g/(2.54 cm)$^3$) such that the inlet coating and the outlet coating are present on the wall flow substrate at a coating loading ratio in the range of from 0.5:1 to 1.5:1, calculated as ratio of the loading of the inlet coating (in g/inch$^3$ (g/(2.54 cm)$^3$)):loading of the outlet coating (in g/inch$^3$ (g/(2.54 cm)$^3$)), said outlet coating comprising an oxidation catalyst comprising Pd and optionally Pt, wherein the Pt concentration in the outlet coating is lower than the Pt concentration in the inlet coating and wherein the weight ratio of Pt:Pd in the outlet coating is in the range of from 0:1 to 2:1.

Yet further provided is a system for treating for treating a diesel engine exhaust stream, the system comprising an exhaust conduit in fluid communication with the diesel engine via an exhaust manifold;

a catalyzed soot as defined above; and one or more of the following in fluid communication with the catalyzed soot filter: a diesel oxidation catalyst (DOC), a selective catalytic reduction (SCR) article, an NOx storage and reduction (NSR) catalytic article.

Still further provided is a method of treating a diesel engine exhaust stream, the exhaust stream containing soot particles, said method comprising contacting the exhaust stream with a catalyzed soot filter as defined above, specifically after having directed the exhaust stream through a diesel oxidation catalyst (DOC), said DOC specifically comprising a flow through substrate or a wall flow substrate.

DETAILED DESCRIPTION

Figure 1:
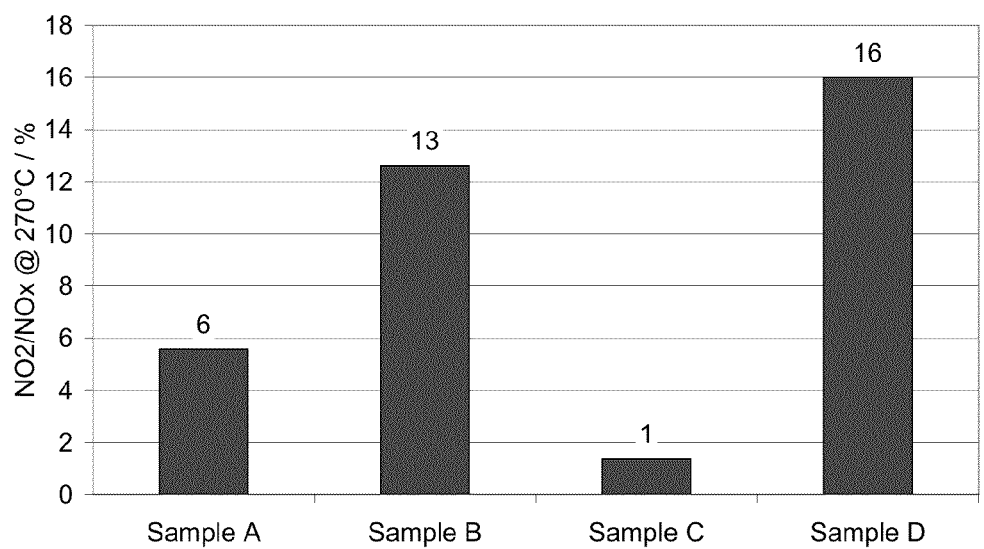
FIG. 1 shows the NO2/NOx ratios as obtained from the treatment of diesel exhaust using the catalysed soot filters according to Samples (A), (B), (C) and (D) of the inventive examples (filters of example 1).
Figure 2:
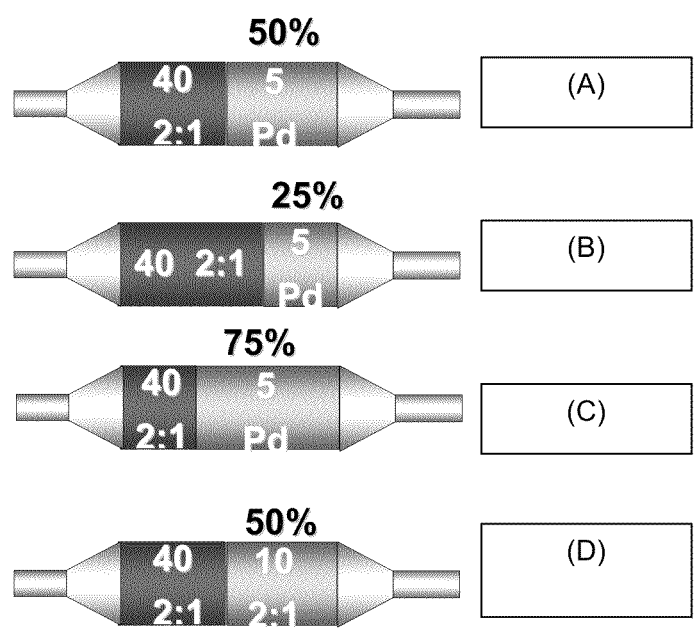
FIG. 2 shows schematic sketches of the catalysed soot filter Samples (A), (B), (C) and (D) as prepared according to Examples 1.1 to 1.4 illustrating the Pt:Pd ratios of inlet and outlet zone and the length of the inlet zone and the outlet zone.

A first aspect of the present invention relates to a catalyzed soot filter. In one embodiment, the filter comprises a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein the internal walls of the inlet passages comprise an inlet coating that extends from the inlet end to an inlet coating end, thereby defining an inlet coating length, wherein the inlet coating length is x % of the substrate axial length, with $0<x\le80$;

wherein the internal walls of the outlet passages comprise an outlet coating that extends from the outlet end to an outlet coating end, thereby defining an outlet coating length, wherein the outlet coating length is 100-x % of the substrate axial length;

wherein the inlet coating length defines an upstream zone of the catalyzed soot filter and the outlet coating length defines a downstream zone of the catalyzed soot filter;

wherein the inlet coating comprises an oxidation catalyst comprising platinum (Pt) and optionally palladium (Pd);

wherein the outlet coating comprises an oxidation catalyst comprising Pd and optionally Pt, wherein the Pt concentration in the outlet coating is lower than the Pt concentration in the inlet coating and wherein the weight ratio of Pt:Pd in the outlet coating is in the range of from 0:1 to 2:1;

wherein the inlet coating and the outlet coating are present on the wall flow substrate at a coating loading ratio in the range of from 0.5 to 1.5, calculated as ratio of the loading of the inlet coating (in g/inch$^3$ (g/(2.54 cm)$^3$)):loading of the outlet coating (in g/inch$^3$ (g/(2.54 cm)$^3$)).

Generally, there are no specific restrictions as far as the inlet coating length and the outlet coating length of the inventive catalyzed soot filter are concerned provided they are in the ranges defined above. Specifically, the inlet coating length is from 20 to 80%, more specifically from 20 to 70%, and more specifically from 20 to 60%, more specifically from 20 to 50% of the substrate axial length. Consequently, the outlet coating length is specifically from 20 to 80%, more specifically from 30 to 80%, more specifically from 40 to 80%, more specifically from 50 to 80% of the substrate axial length.

Therefore, embodiments of the present invention also relate to the catalyzed soot filter defined above, wherein x is in the range of from 20 to 80, in particular from 20 to 50. Specific values of x are, for example, in the range of from 20-30 or from 25-35 or from 30-40 or from 35-45 or from 40-50.

According to an embodiment of the present invention, the inlet coating length is x % of the substrate axial length with $0<x\le80$, and the first outlet coating length is 100-x % of the substrate axial length. Consequently, the sum of the inlet coating length and the outlet coating length may equal the substrate axial length. It has to be understood, however, that due to manufacturing techniques, the inlet coating length and the outlet coating length may overlap through a certain portion ("overlap region"). It is also conceivable that the sum of the inlet coating length and the outlet coating length is slightly less than the substrate axial length resulting in a small gap between the inlet coating end and the outlet coating end wherein on a given internal wall, a certain portion of said internal wall is neither coated with the inlet coating nor coated with the outlet coating ("gap region"). Generally, such gap regions and/or overlap regions of a given internal wall, if present, are at most 1% of the substrate axial length, specifically at most 0.5% of the substrate axial length, more specifically at most 0.1% of the substrate axial length. Even more specifically, the catalyzed soot filter of the present invention has no such gap regions.

According to an embodiment of the present invention, the inlet coating comprises an oxidation catalyst comprising Pt an optionally Pd. While it is generally conceivable that in addition to Pt and optionally Pd, the inlet coating further comprises at least one other oxidation catalyst such as at least one further platinum group metal such as ruthenium (Ru), rhodium (Rh), osmium (Os), and/or iridium (Ir), it is particularly specific that the oxidation catalyst comprised in the inlet coating consists of Pt and optionally Pd.

Further according to an embodiment of the present invention, the outlet coating comprises an oxidation catalyst comprising Pd an optionally Pt. In particular, the Pt concentration in the outlet coating is lower than the Pt concentration in the inlet coating. While it is generally conceivable that in addition to Pd and optionally Pt, the outlet coating further comprises at least one other oxidation catalyst such as at least one further platinum group metal such as ruthenium (Ru), rhodium (Rh), osmium (Os), and/or iridium (Ir), it is particularly specific that the oxidation catalyst comprised in the outlet coating consists of Pd and optionally Pt.

Therefore, embodiments of the present invention also relate to the catalyzed soot filter defined above, wherein the oxidation catalyst comprised in the inlet coating consists of Pt and optionally Pd and the oxidation catalyst comprised in the outlet coating consists of Pd and optionally Pt wherein the Pt concentration in the outlet coating is lower than the Pt concentration in the inlet coating.

According to embodiments of the present invention, the inlet coating and the outlet coating are present on the wall flow substrate at a coating loading ratio in the range of from 0.5 to 1.5, calculated as ratio of the loading of the inlet coating (in $g/inch^3$ ($g/(2.54\ cm)^3$)):loading of the outlet coating (in $g/inch^3$ ($g/(2.54\ cm)^3$)). The term "inlet coating" as used in this context of embodiments of the present invention relate in particular to a washcoat suitably applied on the internal walls of the inlet passages of the wall flow substrate. The term "outlet coating" as used in this context of the present invention relates in particular to a washcoat suitably applied on the internal walls of the outlet passages of the wall flow substrate. Further, The term "loading" of a given coating as used in the context of embodiments of the present invention refers to a loading which is determined by weight measurement of the wall flow substrate used according to the present invention before and after having suitably applied the respective coating, followed by drying and calcinations of the catalyzed soot filter as described hereinunder.

The coating loading ratio of the catalyzed soot filter according to embodiments of the present invention is in the range of from more than 0.5 to less than 1.5, more specifically from 0.6 to 1.5, more specifically from 0.7 to 1.3, more specifically from 0.75 to 1.25, more specifically from 0.8 to 1.2, more specifically from 0.85 to 1.15, more specifically from 0.9 to 1.1, more specifically from 0.95 to 1.05. Thus, typical specific values of the coating loading ratio are, for example, 0.95, 0.96, 0.97, 0.98, 0.99, 1.00, 1.01, 1.02, 1.03, 1.04, 1.05.

Therefore, embodiments of the present invention also relate to the catalyzed soot filter as defined above, wherein the coating loading ratio is in the range of from 0.75 to 1.25, specifically from 0.85 to 1.15, more specifically from 0.95 to 1.05.

Generally, there are no specific restrictions as far as the loading of the inlet coating and the loading of the outlet coating are concerned. Specifically, the inventive catalyzed soot filter exhibits an inlet coating with a loading in the range of from 0.05 to 1 $g/inch^3$ ($g/(2.54\ cm)^3$). Specifically, the inlet coating is present with a loading in the range of from 0.06 to 0.9, more specifically from 0.07 to 0.8, more specifically from 0.08 to 0.7, more specifically from 0.09 to 0.6, and even more specifically from 0.1 to 0.5 $g/inch^3$ ($g/(2.54\ cm)^3$). Even more specifically, the inlet coating is present with a loading in the range of from 0.15 to 0.4, more specifically from 0.2 to 0.3 $g/inch^3$ ($g/(2.54\ cm)^3$). Typical values of the loading of the inlet coating are, for example, 0.20 or 0.22 or 0.24 or 0.35 or 0.26 or 0.28 or 0.30. With the proviso that according to specific embodiments of the present invention, the coating loading ratio is within above-mentioned specific ranges, the loading of the inlet coating and the loading of the outlet coating can be chosen independently from each other. Specifically, the inventive catalyzed soot filter exhibits an outlet coating with a loading in the range of from 0.05 to 1 $g/inch^3$ ($g/(2.54\ cm)^3$). Specifically, the outlet coating is present with a loading in the range of from 0.06 to 0.9, more specifically from 0.07 to 0.8, more specifically from 0.08 to 0.7, more specifically from 0.09 to 0.6, and even more specifically from 0.1 to 0.5 $g/inch^3$ ($g/(2.54\ cm)^3$). Even more specifically, the outlet coating is present with a loading in the range of from 0.15 to 0.4, more specifically from 0.2 to 0.3 $g/inch^3$ ($g/(2.54\ cm)^3$). Typical values of the loading of the outlet coating are, for example, 0.20 or 0.22 or 0.24 or 0.35 or 0.26 or 0.28 or 0.30. According to even more specific embodiments, the loading of the inlet coating is essentially the same, more specifically the same as the loading of the outlet coating.

Therefore, embodiments of the present invention relate to the catalyzed soot filter as defined above, wherein the loading of the inlet coating is in the range of from 0.05 to 1, specifically from 0.1 to 0.5, more specifically from 0.2 to 0.3 $g/inch^3$ ($g/(2.54\ cm)^3$), and wherein the loading of the outlet coating is in the range of from 0.05 to 1, specifically from 0.1 to 0.5, more specifically from 0.2 to 0.3 $g/inch^3$ ($g/(2.54\ cm)^3$).

According to embodiments of the present invention, the inlet coating comprises an oxidation catalyst comprising platinum (Pt) and optionally palladium (Pd). As discussed above, the inlet coating specifically comprises an oxidation catalyst which consists of Pt and optionally Pd. Specific weight ratio of Pt relative to Pd, Pt:Pd, of the inlet coating are in the range of from 1:0 (relating to Pt only inlet coatings) to 2.5:1. More specifically, the weight ratio of Pt:Pd in the inlet coating is in the range of from 1:0 to 2.4, more specifically from 1:0 to 2.3, more specifically from 1:0 to 2.2, more specifically from 1:0 to 2.1. Therefore, embodiments of the present invention also relate to the catalyzed soot filter as defined above, wherein in the inlet coating, the weight ratio of Pt:Pd is in the range of from 1:0 to 2.5:1, specifically from 1:0 to 2.1:1.

According to specific embodiments of the present invention, the oxidation catalyst comprised in the inlet coating comprises, even more specifically consists of Pt and Pd. As to these embodiments, the weight ratio of Pt:Pd is specifically in the range of from 0.1 to 2.5, more specifically from 0.5 to 2.4, more specifically from 1.0 to 2.3, more specifically from 1.5 to 2.2, and even more specifically from 2.0 to 2.1.

According to further specific embodiment of the present invention, the oxidation catalyst comprised in the inlet coating comprises lower amounts of Pd relative to Pt. It is conceived that in particular, inlet coatings are specific comprising, as oxidation catalyst, only Pt. Therefore, embodiments of the present invention also relate to a catalyzed soot filter wherein in the inlet coating, the weight ratio of Pt:Pd is in the range of from 1:0 to 2:1, specifically from 1:0 to less than 2:1, more specifically from 1:0 to 1:1, more specifically from 1:0 to less than 1:1, the weight ratio of Pt:Pd more specifically being 1:0.

Generally, as far as the outlet coating of the inventive catalyzed soot filter is concerned, the weight ratio of Pt:Pd is in the range of from 0:1 to 2:1. More specifically, the maximum value is less than 2:1, such as 1.8:1 or 1.6:1 or 1.4:1 or 1.2:1 or 1:1, specifically 1:1, more specifically less than 1:1 such as 0.8:1 or 0:6:1 or 0.4:1 or 0.2:1 or 0:1. According to a very specific embodiment of the present, the outlet coating contains as oxidation catalyst only Pd.

Therefore, embodiments of the present invention relate to the catalyzed soot filter as defined above, wherein in the outlet coating, the weight ratio of Pt:Pd is in the range of from 0:1 to less than 2:1, more specifically from 0:1 to 1:1, more specifically from 0:1 to less than 1:1.

According to an especially specific embodiment, the present invention relates to the catalyzed soot filter as defined above, wherein in the outlet coating, the weight ratio of Pt:Pd is 0:1.

Generally, the weight ratios of the sum of the weights of Pt and optionally Pd in the inlet coating on the one hand and the weight of the sum of Pd and optionally Pt in the outlet coating on the other hand can be suitably chosen provided that the inlet coating and the outlet coating are present on the wall flow substrate at a coating loading ratio in the range of from 0.5 to 1.5, calculated as ratio of the loading of the inlet coating (in g/inch$^3$ (g/(2.54 cm)$^3$)):loading of the outlet coating (in g/inch$^3$ (g/(2.54 cm)$^3$)), or the respective specific ranges as defined above, and further provided that the Pt concentration in the outlet coating is lower than the Pt concentration in the inlet coating. According to typical embodiments of the present invention, the weight ratio of the sum of the weights of Pt and optionally Pd in the inlet coating to the sum of the weight of Pd and optionally Pt in the outlet coating is in the range of from 1:6 to 10:1.

According to a specific embodiment of the present invention, the weight ratio of the sum of the weights of Pt and optionally Pd in the inlet coating relative to the sum of the weights of Pd and optionally Pt in the outlet coating are in the range of from 1:6 to 2:1. More specifically, this weight ratio is in the range of from 1:5 to 1.7:1, more specifically from 1:4 to 1.3:1, more specifically from 1.3 to 1:1. Therefore, embodiments of the present invention also relate to the catalyzed soot filter as defined above, wherein the weight ratio of the sum of the weights of Pt and optionally Pd in the inlet coating to the sum of the weight of Pd and optionally Pt in the outlet coating is in the range of from 1:6 to 2:1, specifically from 1:3 to 1:1

In particular as far as this specific embodiment is concerned, catalyzed soot filters are specific which have inlet coatings wherein the oxidation catalyst consists of Pt, i.e. inlet coatings being free of Pd and platinum group metals other than Pt. Further, as far as this specific embodiment is concerned, catalyzed soot filters are specific which have outlet coatings wherein the oxidation catalyst consists of Pd, i.e. outlet coatings being free of Pt and platinum group metals other than Pd.

While there are no specific restrictions as far as the Pt concentration in the inlet coating of this specific embodiment is concerned, specific Pt concentrations are in the range of from 0.3 to 2 g/ft$^3$, more specifically from 0.4 to 1.5 g/ft$^3$ (g/(30.48 cm)$^3$), even more specifically from 0.5 to 1 g/ft$^3$ (g/(30.48 cm)$^3$). While there are no specific restrictions as far as the Pd concentration in the outlet coating of this specific embodiment is concerned, specific Pd concentrations are in the range of from 0.3 to 5 g/ft$^3$, more specifically from 0.4 to 4 g/ft$^3$ (g/(30.48 cm)$^3$), even more specifically from 0.5 to 3 g/ft$^3$ (g/(30.48 cm)$^3$).

Therefore, embodiments of the present invention also relate to a catalyzed soot filter as defined above, wherein in the inlet coating, the weight ratio of Pt:Pd is 1:0 and the concentration of Pt is in the range of from 0.5 to 1 g/ft$^3$ (g/(30.48 cm)$^3$), and wherein in the outlet coating, the weight ratio of Pt:Pd is 0:1 and the concentration of Pd is in the range of from 0.5 to 3 g/ft$^3$ (g/(30.48 cm)$^3$).

According to a further specific embodiment of the present invention, the weight ratio of the sum of the weights of Pt and optionally Pd in the inlet coating relative to the sum of the weights of Pd and optionally Pt in the outlet coating is in the range of from 2.4:1 to 10:1. More specifically, this weight ratio is in the range of from 2.5:1 to 9.5:1, more specifically from 3:1 to 9:1, more specifically from 4:1 to 8.5:1, more specifically from 5:1 to 8:1. Therefore, embodiments of the present invention also relate to a catalyzed soot filter as defined above, wherein the weight ratio of the sum of the weights of Pt and optionally Pd in the inlet coating to the sum of the weight of Pd and optionally Pt in the outlet coating is in the range of from 2.4:1 to 10:1, specifically from 5:1 to 8:1.

In particular as far as this specific embodiment is concerned, catalyzed soot filters are specific which have inlet coatings wherein the weight ratio of Pt:Pd is in the range of from 1:0 to 1:1 such as, for example, from 50:1 to 1:1 or from 20:1 to 1:1 or from 10:1 to 1:1 or from 5:1 to 1:1 or from 2:1 to 1:1. Further, as far as this specific embodiment is concerned, catalyzed soot filters are specific which have outlet coatings wherein the weight ratio of Pt:Pd is in the range of from 0:1 to 2:1 such as, for example, from 1:50 to 1:1 or from 1:20 to 1:1 or from 1:10 to 1:1 or from 1:5 to 1:1 of from 1:2 to 1.1. Most specifically, in the context of this specific embodiment, the Pt:Pd weight ratio in the outlet coating is 0:1.

While there are no specific restrictions as far as the Pt concentration in the inlet coating of this specific embodiment is concerned, specific Pt concentrations are in the range of from 5 to 100 g/ft$^3$, more specifically from 10 to 60 g/ft$^3$ (g/(30.48 cm)$^3$), even more specifically from 15 to 40 g/ft$^3$ (g/(30.48 cm)$^3$), such as from 20 to 40 g/ft$^3$ or from 25 to 30 g/ft$^3$. While there are no specific restrictions as far as the Pd concentration in the outlet coating of this specific embodiment is concerned, specific Pd concentrations are in the range of from 1 to 10 g/ft$^3$ (g/(30.48 cm)$^3$), more specifically from 2 to 8/ft$^3$ (g/(30.48 cm)$^3$), even more specifically from 4 to 6 g/ft$^3$ (g/(30.48 cm)$^3$).

Therefore, embodiments of the present also relates to a catalyzed soot filter as defined above, wherein in the inlet coating, the weight ratio of Pt:Pd is in the range of from 1:0 to 1:1, specifically from 1:0 to 0:4, and the concentration of Pt is in the range of from 5 to 100 g/ft$^3$ (g/(30.48 cm)$^3$), specifically from 10 to 60 g/ft$^3$ (g/(30.48 cm)$^3$), more specifically from 15 to 40 g/ft$^3$ (g/(30.48 cm)$^3$), and wherein in the outlet coating, the weight ratio of Pt:Pd is in the range of from 0:1 to 1:1, specifically 0:1, and the concentration of Pd is in the range of from 1 to 10 g/ft$^3$ (g/(30.48 cm)$^3$), specifically from 2 to 8 g/ft$^3$ (g/(30.48 cm)$^3$), more specifically from 4 to 6 g/ft$^3$ (g/(30.48 cm)$^3$).

Embodiments of catalyzed soot filters which are especially specific in the context of the present invention are characterized in that the outlet coating comprises an oxidation catalyst which consists of Pd and which is free of Pt and also free of platinum group metals other than Pd and Pt. As to the inlet coating, it is specific that apart from Pt and optionally also Pd, no platinum group metals other than Pt and optionally Pd are comprised. Therefore, embodiments of the present invention also relate to a catalyzed soot filter as defined above, wherein the oxidation catalyst comprised in the inlet coating consists of Pt and optionally Pd and the oxidation catalyst comprised in the outlet coating consists of Pd.

According to a specific embodiment of the present invention, the inlet coating comprises at least one porous support material. While there are no specific restrictions, it is specific that the porous support material is a refractory metal oxide. More specifically, the porous support material of the inlet coating is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. More specifically, the at least one porous support material is selected from the group consisting of Al2O3, ZrO2, CeO2, SiO2 and a mixture of tow or more thereof.

According to a specific embodiment of the present invention, the outlet coating comprises at least one porous support material. While there are no specific restrictions, it is specific that the porous support material is a refractory metal oxide. More specifically, the porous support material of the outlet coating is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. More specifically, the at least one porous support material is selected from the group consisting of Al2O3, ZrO2, CeO2, SiO2 and a mixture of two or more thereof.

Therefore, embodiments of the present invention also relate to a catalyzed soot filter as described hereinabove, wherein the inlet coating and the outlet coating comprise at least one porous support material, wherein the at least one porous support material of the inlet coating is specifically selected from the group consisting of Al2O3, ZrO2, CeO2, SiO2 and a mixture of two or more thereof, and wherein the at least one porous support material of the outlet coating is specifically selected from the group consisting of Al2O3, ZrO2, CeO2, SiO2 and a mixture of two or more thereof.

According to a specific embodiment, the refractory metal oxide of the inlet coating and/or the outlet coating essentially consists of alumina, more specifically of gamma alumina or activated alumina, such as gamma or eta alumina. Specifically, the activated alumina has a specific surface area, determined according to BET surface area measurements, of from 60 to 300 $m^2/g$, specifically from 90 to 200 $m^2/g$ mostly specific 100 to 180 $m^2/g$. Therefore, embodiments of the present invention also relate to a catalyzed soot filter as defined above, wherein the support material of the inlet coating is Al2O3, specifically gamma-Al2O3, and wherein the support material of the outlet coating is Al2O3, specifically gamma-Al2O3.

Wall flow substrates useful for the catalyzed soot filter of the present invention have a plurality of fine, substantially parallel flow passages extending along the longitudinal axis of the substrate. Each passage is blocked at one end of the substrate body, with alternate passages blocked at opposite end-faces. Such monolithic carriers may contain up to about 400 flow passages (or "cells") per square inch ($(2.54 cm)^2$) of cross section, although far fewer may be used. For example, the carrier may have from 7 to 400, specifically from 100 to 400, cells per square inch ("cpsi"). The cells can have cross sections that are rectangular, square, circular, oval, triangular, hexagonal, or are of other polygonal shapes.

Specific wall flow substrates are composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Specific wall flow substrates are formed from cordierite and silicon carbide. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133. According to embodiments of the present invention, wall flow substrates are specific having a porosity in the range from 38 to 75.

Therefore, embodiments of the present invention also relate to a catalyzed soot filter as defined above, wherein the wall flow substrate has a porosity in the range of from 38 to 75, determined according to mercury porosity measurement according to DIN 66133, wherein the wall flow substrate is specifically a cordierite substrate or a silicon carbide substrate.

For instance, in some configurations, a wall flow substrate having a porosity of 60 and a mean pore diameter of about 15-25 microns provide adequate exhaust flow. Other specific embodiments are, for example, configurations that use wall flow substrates with 100 cpsi that have a 17 mil wall (1 mil corresponds to 0.0254 mm), and wall flow substrate with 300 cpsi and a 12-14 mil.

Generally, there are no restrictions as to the substrate axial lengths of the catalyzed soot filter of the present invention. Substrate axial lengths will mainly depend on the intended use of the catalyzed soot filter of the present invention. Typical substrate axial lengths of catalyzed soot filter used, for example, in the automotive area are in the range of from 4 to 10 in (10.16 cm to 25.4 cm), specifically from 6 to 8 inches (15.24 cm to 20.32 cm).

Each of the coatings of embodiments of the present invention present on the wall flow substrate is formed from a respective washcoat composition that contains the at least one porous support material as described above. Other additives such as binders and stabilizers can also be included in the washcoat composition. Such stabilizers can be included in either the first inlet coating or in the first outlet coating or in further outlet coatings, as described hereinunder. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from at least one alkaline earth metal components selected from the group consisting of magnesium, barium, calcium and strontium, specifically strontium and barium. When present, stabilizers materials are added at from about 0.01 $g/in^3$ ($g/(2.54 cm)^3$) to 0.15 $g/in^3$ ($g/(2.54 cm)^3$) in the coating.

A given coating is disposed on the surface of the internal walls. Further, it is conceivable that a given coating is disposed on another coating which had been applied onto the surface of the internal walls or onto yet another coating. Further, a given coating may partially permeate the porous internal walls or the coating onto which it is applied.

For the preparation of the washcoat composition to be applied onto the internal walls of the wall flow substrate, it is specific to disperse a suitable Pt and/or Pd component precursor on a suitable porous support material, specifically a suitable refractory metal oxide as described hereinabove. More specifically, a water-soluble or water-dispersible Pt and/or Pd component precursor is/are impregnated on a suitable porous support material, specifically a suitable refractory metal oxide, followed by drying and fixing steps. Suitable Pt and/or Pd component precursors include, for example, potassium platinum chloride, ammonium platinum thiocyanate, amine-solubilized platinum hydroxide, chloroplatinic acid, palladium nitrate, and the like. Other suitable precursors will be apparent to those of skill in the art. The impregnated support material is specifically dried with the Pt and/or Pd component fixed thereon. Generally, drying temperatures are in the range from 60 to 250° C., specifically from 90 to 210° C., more specifically from 100 to 150° C. Drying can be carried out in any suitable atmosphere, with N2 or air being specific. After drying, it is specific to finally fix the Pt and/or Pd component on the support material by suitable calcination and/or other suitable methods such as treatment with acetic acid. In general, any method resulting in the Pt and/or Pd component being in water-insoluble form is suitable. Generally, calcination temperatures are in the range from 250 to 800° C., specifically from 350 to 700° C., more specifically from 400 to 600° C. Calcination can be carried out in any suitable atmosphere, with N2 or air being specific. By, for example, calcination, the catalytically active elemental Pt and/or Pd or the respective oxide is obtained. It is to be understood that the term "Pt component" or "Pd component" present in the finally obtained catalyzed soot filter as used in the context of the present invention relates to the Pt and/or Pd component in the form of the catalytically active elemental Pt and/or Pd, or the oxide thereof, or the mixture of elemental Pt and/or Pd and the oxide thereof.

Therefore, embodiments of the present invention also relate to a process for manufacturing a catalyzed soot filter as defined above, the process comprising (i) providing a wall flow substrate, specifically having a porosity in the range of from 38 to 75, determined according to mercury porosity measurement according to DIN 66133, wherein the wall flow substrate is specifically a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;
wherein the plurality of passages comprise inlet passages having an open inlet end and a closed outlet end, and outlet passages having a closed inlet end and an open outlet end;
(ii) applying an inlet coating to the internal walls of the inlet passages such that the inlet coating extends from the inlet end to an inlet coating end whereby an inlet coating length is defined, wherein the inlet coating length is x % of the substrate axial length with $0 \leq x \leq 80$, thereby adjusting the loading of the inlet coating to a predetermined value which is specifically in the range of from 0.05 to 1 g/inch$^3$ (g/(2.54 cm)$^3$), said inlet coating comprising an oxidation catalyst comprising platinum (Pt) and optionally palladium (Pd);
(iii) before (ii) or simultaneously with (ii) or after (iii), applying an outlet coating to the internal walls of the outlet passages such that the outlet coating extends from the outlet end to an outlet coating end whereby an outlet coating length is defined, wherein the outlet coating length is 100-x % of the substrate axial length, thereby adjusting the loading of the outlet coating to a predetermined value which is specifically in the range of from 0.05 to 1 g/inch$^3$ (g/(2.54 cm)$^3$) such that the inlet coating and the outlet coating are present on the wall flow substrate at a coating loading ratio in the range of from 0.5:1 to 1.5:1, calculated as ratio of the loading of the inlet coating (in g/inch$^3$ (g/(2.54 cm)$^3$)):loading of the outlet coating (in g/inch$^3$ (g/(2.54 cm)$^3$)), said outlet coating comprising an oxidation catalyst comprising Pd and optionally Pt, wherein the Pt concentration in the outlet coating is lower than the Pt concentration in the inlet coating and wherein the weight ratio of Pt:Pd in the outlet coating is in the range of from 0:1 to 2:1.

Specific values of the ranges, lengths, concentrations and the like, as far as the inventive catalyzed soot filter are concerned are as defined above.

The catalyzed soot filter of embodiments of the present invention can be used in an integrated emission treatment system, in particular in an exhaust conduit comprising one or more additional components for the treatment of diesel exhaust emissions. For example, such exhaust conduit which is most specifically in fluid communication with the diesel engine may comprise a catalyzed soot filter according to embodiments of the present invention and may further comprise a diesel oxidation catalyst (DOC) article and/or a selective catalytic reduction (SCR) article and/or an NOx storage and reduction (NSR) catalytic article. Most specifically, the DOC article and/or the SCR article and/or the NSR article are in fluid communication with the catalyzed soot filter. The diesel oxidation catalyst can be located upstream or downstream from the catalyzed soot filter and/or selective catalytic reduction component. More specifically, the catalyzed soot filter of embodiments of the present invention is located downstream from the DOC article. Still more specifically the catalyzed soot filter of the present invention is located either upstream or downstream of the SCR article.

Therefore, embodiments of the present invention also relate to the catalyzed soot filter as defined above, comprised in a system for treating a diesel engine exhaust stream, the system further comprising an exhaust conduit in fluid communication with the diesel engine via an exhaust manifold, and further comprising one or more of the following in fluid communication with the catalyzed soot filter: a diesel oxidation catalyst (DOC), a selective catalytic reduction (SCR) article, an NOx storage and reduction (NSR) catalytic article.

Even more specifically, downstream the inventive catalyzed soot filter, there is no NOx reduction catalytic article comprised in the system, specifically no NOx storage and reduction (NSR) catalytic article.

A suitable SCR article for use in the exhaust conduit is typically able to catalyze the reaction of O2 with any excess NH3 to N2 and H2O, so that NH3 is not emitted to the atmosphere. Useful SCR catalyst compositions used in the exhaust conduit should also have thermal resistance to temperatures greater than 650° C. Such high temperatures may be encountered during regeneration of the upstream catalyzed soot filter. Suitable SCR articles are described, for instance, in U.S. Pat. No. 4,961,917 and U.S. Pat. No. 5,516,497. Suitable SCR articles include one or both of an iron and a copper promoter typically present in a zeolite in an amount of from about 0.1 to 30 percent by weight, specifically from about 1 to 5 percent by weight, of the total weight of promoter plus zeolite. Typical zeoites may exhibit a CHA framework structure.

According to an especially specific embodiment of the present invention, the inventive catalyzed soot filter is arranged downstream of the DOC. In such an arrangement, the inventive catalyzed soot filter provides the advantage that HC and CO are reduced during soot combustion which is most specifically achieved by the upstream zone of the inventive filter. Further, the specific design of the rear zone ensures that in the downstream zone of the catalyzed soot filter, as low an amount of NOx as possible is generated. Thus, downstream such DOC, it was found that the inventive catalyzed soot filter is very advantageous in its clean-up function for the treatment of diesel exhaust.

Therefore, embodiments of the present invention also relate to the catalyzed soot filter as defined above, comprised in a system for treating a diesel engine exhaust stream, the system further comprising an exhaust conduit in fluid communication with the diesel engine via an exhaust manifold, and further comprising a diesel oxidation catalyst wherein the catalyzed soot filter is arranged downstream of the DOC.

Also, embodiments of the present invention relate to the catalyzed soot filter as defined above for use in a method of treating a diesel engine exhaust stream, the exhaust stream containing soot particles, said method comprising contacting the exhaust stream with the catalyzed soot filter, specifically after having directed the exhaust stream through a diesel oxidation catalyst (DOC), said DOC specifically comprising a flow through substrate or a wall flow substrate. Similarly, embodiments of the present invention relate to the use of the catalyzed soot filter as defined above for treating a diesel engine exhaust stream, the exhaust stream containing soot particles, wherein the exhaust stream is contacted with the catalyzed soot filter, specifically after having directed the exhaust stream through a diesel oxidation catalyst (DOC), said DOC specifically comprising a flow through substrate or a wall flow substrate.

Further, embodiments of the present invention relate to a system for treating for treating a diesel engine exhaust stream, the system comprising an exhaust conduit in fluid communication with the diesel engine via an exhaust manifold;

a catalyzed soot filter as defined above; and one or more of the following in fluid communication with the catalyzed soot filter: a diesel oxidation catalyst (DOC), a selective catalytic reduction (SCR) article, an NOx storage and reduction (NSR) catalytic article.

Specifically, in this system, the catalyzed soot filter is arranged downstream of the DOC. More specifically, the system does not contain an NOx reduction catalytic article, and more specifically, the system does not contain an NOx storage and reduction (NSR) catalytic article.

Therefore, embodiments of the present invention also relate to a method of treating a diesel engine exhaust stream, the exhaust stream containing soot particles, said method comprising contacting the exhaust stream with a catalyzed soot filter as defined above, specifically after having directed the exhaust stream through a diesel oxidation catalyst (DOC), said DOC specifically comprising a flow through substrate or a wall flow substrate.

According to an optional embodiment of the present invention, this method further comprises directing the exhaust stream resulting from the DOC or from the catalyzed soot filter through a selective catalytic reduction (SCR) article.

In the following, the present invention is further illustrated by the following non-limiting examples.

EXAMPLES

1. Catalyst Preparation 1.1 Zoned Catalysed Soot Filter with a Pd-Rear Outlet Coat—50% of Length (Sample A)

For the inlet coating 0.25 g/in3 of gamma-alumina was impregnated with an aqueous solution of Palladium nitrate giving a final dry Pd content of 13 g/ft$^3$ followed by an impregnation of a Platinum solution with Platinum as an ammine stabilized Pt complex to give a dry content of Pt 27 g/ft$^3$. The resulting powder was dispersed in water. Subsequently, the resulting slurry was used for coating the cordierite filter substrate from the inlet side to 50% of the total filter length. After drying at 110° C. air and calcination at 450° C. in air the amount of washcoat on the 50% inlet of the filter substrate were approximately 0.27 g/in$^3$.

For the outlet coating 0.25 g/in3 of gamma-alumina was impregnated with an aqueous solution of Palladium nitrate giving a final dry Pd content of 5 g/ft$^3$. The resulting powder was dispersed in water. Subsequently, the resulting slurry was used for coating the cordierite filter substrate from the filter outlet side to 50% of the total filter length. After drying at 110° C. air and calcination at 450° C. in air the amount of washcoat on the 50% outlet of the filter substrate were approximately 0.26 g/in$^3$.

1.2 Zoned Catalysed Soot Filter with a Pd-Rear Outlet Coat—25% of Length (Sample B)

For the inlet coating 0.25 g/in3 of gamma-alumina was impregnated with an aqueous solution of Palladium nitrate giving a final dry Pd content of 13 g/ft$^3$ followed by an impregnation of a Platinum solution with Platinum as an ammine stabilized Pt complex to give a dry content of Pt 27 g/ft$^3$. The resulting powder was dispersed in water. Subsequently, the resulting slurry was used for coating the cordierite filter substrate from the inlet side to 75% of the total filter length. After drying at 110° C. air and calcination at 450° C. in air the amount of washcoat on the 75% inlet of the filter substrate were approximately 0.27 g/in$^3$.

For the outlet coating 0.25 g/in3 of gamma-alumina was impregnated with an aqueous solution of Palladium nitrate giving a final dry Pd content of 5 g/ft$^3$. The resulting powder was dispersed in water. Subsequently, the resulting slurry was used for coating the cordierite filter substrate from the filter outlet side to 25% of the total filter length. After drying at 110° C. air and calcination at 450° C. in air the amount of washcoat on the 25% outlet of the filter substrate were approximately 0.26 g/in$^3$.

1.3 Zoned Catalysed Soot Filter with a Pd-Rear Outlet Coat—75% of Length (Sample C)

For the inlet coating 0.25 g/in3 of gamma-alumina was impregnated with an aqueous solution of Palladium nitrate giving a final dry Pd content of 13 g/ft$^3$ followed by an impregnation of a Platinum solution with Platinum as an ammine stabilized Pt complex to give a dry content of Pt 27 g/ft$^3$. The resulting powder was dispersed in water. Subsequently, the resulting slurry was used for coating the cordierite filter substrate from the inlet side to 25% of the total filter length. After drying at 110° C. air and calcination at 450° C. in air the amount of washcoat on the 25% inlet of the filter substrate were approximately 0.27 g/in$^3$.

For the outlet coating 0.25 g/in3 of gamma-alumina was impregnated with an aqueous solution of Palladium nitrate giving a final dry Pd content of 5 g/ft$^3$. The resulting powder was dispersed in water. Subsequently, the resulting slurry was used for coating the cordierite filter substrate from the filter outlet side to 75% of the total filter length. After drying at 110° C. air and calcination at 450° C. in air the amount of washcoat on the 75% outlet of the filter substrate were approximately 0.26 g/in$^3$.

1.4 Zoned Catalysed Soot Filter with a Pt/Pd Inlet and Outlet Coating, Comparative Example: (Sample D)

For the inlet coating 0.25 g/in3 of gamma-alumina was impregnated with an aqueous solution of Palladium nitrate giving a final dry Pd content of 13 g/ft$^3$ followed by an impregnation of a Platinum solution with Platinum as an ammine stabilized Pt complex to give a dry content of Pt 27 g/ft$^3$. The resulting powder was dispersed in water. Subsequently, the resulting slurry was used for coating the cordierite filter substrate from the inlet side to 50% of the total filter length. After drying at 110° C. air and calcination at 450° C. in air the amount of washcoat on the 50% inlet of the filter substrate were approximately 0.27 g/in$^3$.

For the outlet coating 0.25 g/in3 of gamma-alumina was impregnated with an aqueous solution of Palladium nitrate giving a final dry Pd content of 3 g/ft$^3$ followed by an impregnation of a Platinum solution with Platinum as an ammine stabilized Pt complex to a dry content of Pt 7 g/ft$^3$. The resulting powder was dispersed in water. Subsequently, the resulting slurry was used for coating the cordierite filter substrate from the filter outlet side to 50% of the total filter length. After drying at 110° C. air and calcination at 450° C. in air the amount of washcoat on the 50% outlet of the filter substrate were approximately 0.26 g/in³.

2. Comparison of State of the Art Catalyst Technologies with Invention Technology (Light-Off Test)

Test Samples:
2.1 Sample A:
Zoned catalysed soot filter with a 5 g/ft³ Pd outlet coating—50% of substrate length:
Inlet coat: 27 g/ft³ Pt, 13 g/ft³ Pd—50% of length
Outlet coat: 5 g/ft³ Pd—50% of 50% of length
2.2 Sample B:
Zoned catalysed soot filter with a 5 g/ft³ Pd outlet coating—25% of substrate length:
Inlet coat: 27 g/ft³ Pt, 13 g/ft³ Pd—75% of length
Outlet coat: 5 g/ft³ Pd—50% of 25% of length
2.3 Sample C:
Zoned catalysed soot filter with a 5 g/ft³ Pd outlet coating—75% of substrate length:
Inlet coat: 27 g/ft³ Pt, 13 g/ft³ Pd—25% of length
Outlet coat: 5 g/ft³ Pd—50% of 75% of length
2.4 Sample D (Comparative):
Zoned catalysed soot filter with a Pt/Pd inlet and outlet coating
Inlet coat: 27 g/ft³ Pt, 13 g/ft³ Pd—50% of length
Outlet coat: 7 g/ft³ Pt, 3 g/ft³ Pd—50% of length

3. Test Procedure NO2/NOx Light-Off Testing

Samples A, B, C and D were tested for NO2 light-off performance. Prior testing the samples were aged in the exhaust stream of a 4 cylinder light duty diesel engine with 2.7 L engine displacement for 25 h. The temperature of the exhaust stream was raised by an upstream burner DOC to 750° C. steady state.

For light-off testing the each sample was placed downstream in the exhaust line a 4 cylinder light duty common rail diesel engine with 2 L engine displacement. The CO, HC, NOx and NO concentration in the exhaust stream was 180 ppm, 18 ppm, (C3 basis), 570 ppm and 540 ppm, respectively. The gas flow under standard conditions was around 80 m³/h. The temperature ramp was 5 K/min. The NO2/NOx ratio at 300° C. pre CSF temperature was used for evaluation. A lower NO2/NOx ratio at 300° C. relates to a lower NO2 formation during driving.

The NO2/NOx ratio at 300° C. during light-off Samples (A) to (D) are shown in FIG. 1.

Samples A, B and C showed lower maximum NO2/NOx ratio compared to Sample D and therefore a lower NO2 tail pipe emission during driving. The lowest NO2/NOx ratio is observed for Sample C with the longest Pd-only rear zone among Samples (A), (B) and (C).

4. Catalyst Preparation 4.1 Uniform Catalysed Soot Filter with a Pt Coat Over the Whole Length and No Pd Rear Zone (Sample 1-Comparative)

A 0.05 g/in3 of gamma-alumina was impregnated with an aqueous solution of Platinum solution with Platinum as an ammine stabilized Pt complex to give a dry content of Pt of 5 g/ft³. The resulting powder was dispersed in water. Subsequently, the resulting slurry was used for coating the filter substrate (size: 132.1×203,2 mm; silicon carbide with 42% porosity) from the inlet side over the total filter length. After drying at 110° C. air and calcination at 450° C. in air the amount of washcoat on the inlet of the filter substrate were approximately 0.053.

4.2 Uniform Catalysed Soot Filter with a Pt Coat Over the Whole Length and No Pd Rear Zone (Sample 2-Comparative)

A 0.05 g/in3 of gamma-alumina was impregnated with an aqueous solution of Platinum solution with Platinum as an ammine stabilized Pt complex to give a dry content of Pt of 1 g/ft3. The resulting powder was dispersed in water. Subsequently, the resulting slurry was used for coating the filter substrate (size: 132.1×203,2 mm; silicon carbide with 42% porosity) from the inlet side over the total filter length. After drying at 110° C. air and calcination at 450° C. in air the amount of washcoat on the inlet of the filter substrate were approximately 0.051 g/in³.

4.3 Zoned Catalysed Soot Filter with a Pd-Rear Outlet Coat—50% of Length (Sample 3-Inventive)

For the inlet coating, 0.3 g/in3 of gamma-alumina was impregnated with an aqueous solution of Platinum with Platinum as an amine stabilized Pt complex to give a dry content of Pt 1 g/ft³. The resulting powder was dispersed in water. Subsequently, the resulting slurry was used for coating the cordierite filter substrate (size: 143.8×152.4 mm, cordierite with 50% porosity) from the inlet side to 50% of the total filter length. After drying at 110° C. air and calcination at 450° C. in air the amount of washcoat on the 50% inlet of the filter substrate were approximately 0.301 g/in³.

For the outlet coating 0.3 g/in3 of gamma-alumina was impregnated with an aqueous solution of Palladium nitrate giving a final dry Pd content of 3 g/ft³. The resulting powder was dispersed in water. Subsequently, the resulting slurry was used for coating the cordierite filter substrate from the filter outlet side to 50% of the total filter length. After drying at 110° C. air and calcination at 450° C. in air the amount of washcoat on the 50% outlet of the filter substrate were approximately 0.302 g/in³.

4.4 Test Procedure NO2/NOx Light-Off Testing

Samples 1, 2, and 3 were tested for NO2 light-off performance. Prior testing, sample 3 was aged in the exhaust stream of a 4 cylinder light duty diesel engine with 2.7 L engine displacement for 20 h. The temperature of the exhaust stream was raised by an upstream burner DOC to 750° C. steady state. Sample 1 was hydrothermally aged for 12 h in an oven at 800° C. Sample 2 was hydrothermally aged for 5 h in an oven at 750° C.

For light-off testing the each sample was placed downstream in the exhaust line a 4 cylinder light duty common rail diesel engine with 2 L engine displacement. The CO, HC, NOx and NO concentration in the exhaust stream was 180 ppm, 18 ppm, (C3 basis), 570 ppm and 540 ppm, respectively. The gas flow under standard conditions was around 80 m³/h. The temperature ramp was 5 K/min. The NO2/NOx ratio at 300° C. pre CSF temperature was used for evaluation. A lower NO2/NOx ratio at 300° C. relates to a lower NO2 formation during driving.

4.5 Test Procedure HC and CO Breakthrough

Evaluation of CO and HC breakthrough: soot regeneration test

It is one of the tasks of a catalyzed soot filter to assure a clean soot combustion process by converting both HC and CO that is formed during the soot regeneration. The evaluation of the unwanted CO and HC is conducted with a soot regeneration test.

Figure 3:
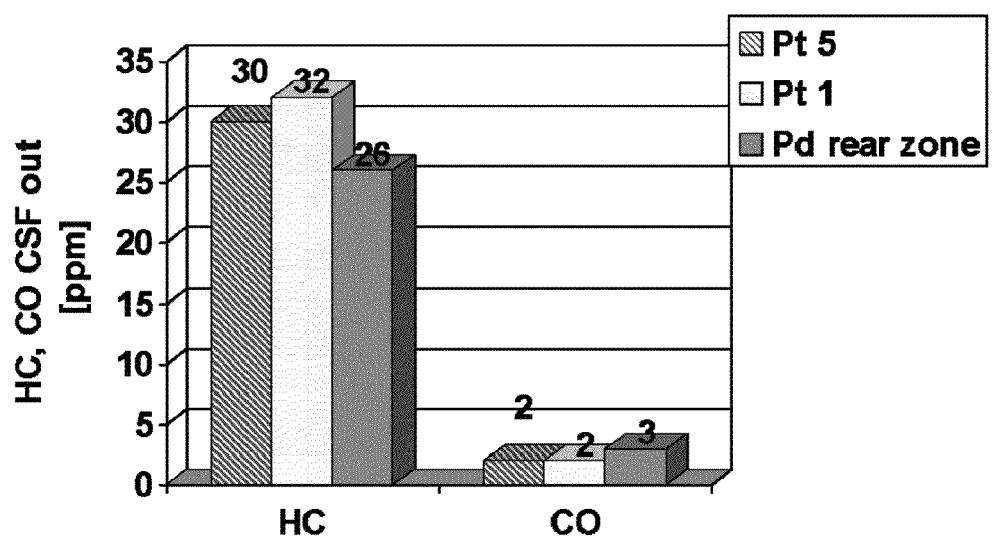
FIG. 3 shows the HC and CO breakthrough as obtained when treating diesel exhaust gas using the catalysed soot filters according to Samples (1), (2), (3) of the inventive examples (catalysts of example 4).

The catalysed soot filter (CSF) was fitted to an engine test stand together with a diesel oxidation catalyst (DOC) that was placed in front of the CSF. DOC and CSF were placed downstream in the exhaust line of a 4 cylinder light duty common rail diesel engine with 2 L engine displacement. First, 6 g soot/dm³ CSF were accumulated on the CSF by running a simulated drive cycle. Next, the soot was burnt on the engine by creating an exothermic reaction over the DOC. Additional fuel injection into the combustion chamber by means of a common rail injection system increased the exhaust temperature from 250° C. to 500° C. inlet to the DOC and created an increase in temperature of 130° C. over the DOC. The inlet temperature to the CSF of 630° C. was kept for 10 min in order to burn the soot. The exhaust flow was set to 150 m3/h (at 20° C.). The HC concentration inlet to the CSF was 200 ppm (C3 basis), the CO concentration 100 ppm. During the soot combustion process, additional CO was formed which the catalyst on the CSF had to convert as well. This additional CO concentration depends on the soot loading on the filter and amounted here to a maximum of 700 ppm. The concentrations given in FIG. 3 refer to an average concentration outlet to the CSF in case of HC and a maximum CO concentration outlet to the CSF.

4.6 Results

Figure 4:
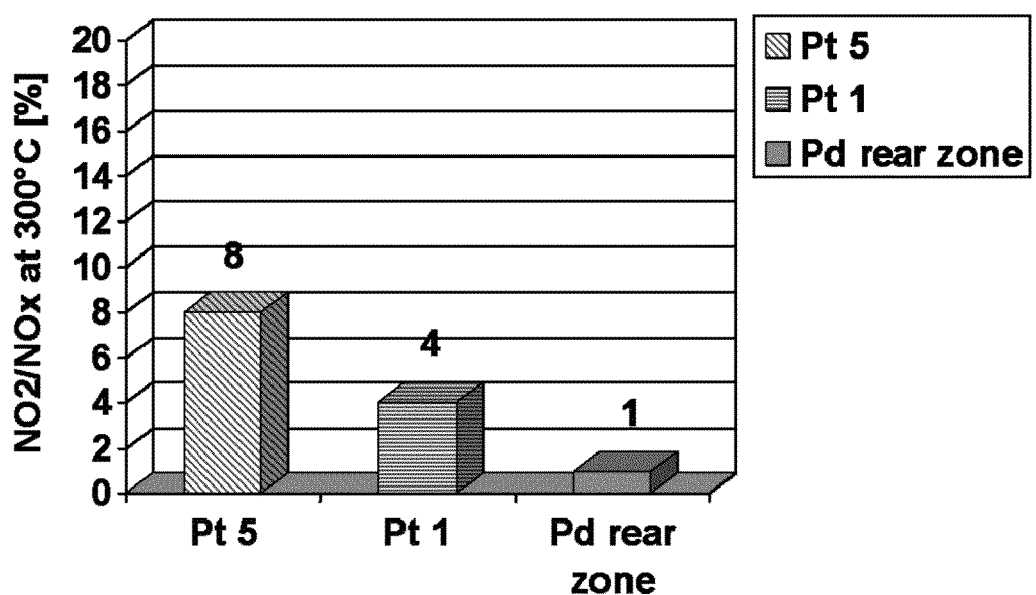
FIG. 4 shows the NO2/NOx ratios as obtained from the treatment of diesel exhaust using the catalysed soot filters according to Samples (1), (2), (3) of the examples (catalysts of example 4).

The NO2/NOx ratio at 300° C. during light-off Samples (1) to (3) are shown in FIG. 4. Sample 3 with Pd in the rear zone and Pt in the inlet zone shows by far the lowest NO2/NOx ratio, with only ¼ of the ratio compared to sample 2 and even ⅛ of the ratio of sample 1.

At the same time, the inventive catalysed soot filter leads to an HC breakthrough which is even lower than the respective HC breaktroughs of the catalysed soot filters according to samples 1 and 2, and with a CO breaktrough which is essentially the same as the CO breakthrough of samples 1 and 2. Accordingly, the inventive zoned catalysed soot filter with a Pd only rear zone allows for obtaining or even slightly improving the HC and CO breaktrough characteristics of Pt-only catalyzed soot filter and, simultaneously, significantly reducing the NO2/NOx ratio of the gas stream leaving the filter.

It is noted that at the same time, the inventive catalysed soot filter of sample 3, compared to samples 1 and 2, contains a substantially decreased amount of Pt, a considerable improvement, e.g. due to the high costs of Pt compared to Pd.

The invention claimed is:

1. A catalyzed soot filter, comprising a wall flow substrate comprising an inlet end, an outlet end, a substrate axial length extending between the inlet end and the outlet end, and a plurality of passages defined by internal walls of the wall flow filter substrate; wherein the plurality of passages comprise inlet passages having an open inlet end and a closed outlet end, and outlet passages having a closed inlet end and an open outlet end; wherein the internal walls of the inlet passages comprise an inlet coating that extends from the inlet end to an inlet coating end, thereby defining an inlet coating length, wherein the inlet coating length is x % of the substrate axial length, with 0<x≤80; wherein the internal walls of the outlet passages comprise an outlet coating that extends from the outlet end to an outlet coating end, thus defining an outlet coating length, wherein the outlet coating length is 100-x % of the substrate axial length; wherein the inlet coating length defines an upstream zone of the catalyzed soot filter and the outlet coating length defines a downstream zone of the catalyzed soot filter; wherein the inlet coating comprises an oxidation catalyst comprising platinum (Pt); wherein the outlet coating comprises an oxidation catalyst comprising Pd, wherein the Pt concentration in the outlet coating is lower than the Pt concentration in the inlet coating and wherein the weight ratio of Pt:Pd in the outlet coating is in the range of from 0:1 to 2:1; wherein the inlet coating and the outlet coating are present on the wall flow substrate at a coating loading ratio in the range of from 0.5 to 1.5, calculated as ratio of the loading of the inlet coating (in g/inch³ (g/(2.54 cm)³)): loading of the outlet coating (in g/inch³ (g/(2.54 cm)³)).

2. The catalyzed soot filter of claim 1, wherein x is in the range of from 20 to 50.

3. The catalyzed soot filter of claim 1, wherein the coating loading ratio is in the range of from 0.75 to 1.05.

4. The catalyzed soot filter of claim 1, wherein the loading of the inlet coating is in the range of from 0.05 to 1 g/inch³ (g/(2.54 cm)3), and wherein the loading of the outlet coating is in the range of from 0.05 to 1 g/inch³ (g/(2.54 cm)³).

5. The catalyzed soot filter of claim 1, wherein in the inlet coating, the weight ratio of Pt:Pd is in the range of from 1:0 to 2.5:1.

6. The catalyzed soot filter of claim 1, wherein in the inlet coating, the weight ratio of Pt:Pd is 1:0.

7. The catalyzed soot filter of claim 1, wherein in the outlet coating, the weight ratio of Pt:Pd is in the range of from 0:1 to 1:1.

8. The catalyzed soot filter of claim 1, wherein in the outlet coating, the weight ratio of Pt:Pd is 0:1.

9. The catalyzed soot filter of claim 1, wherein the weight ratio of the sum of the weights of Pt and Pd in the inlet coating to the sum of the weight of Pd and Pt in the outlet coating is in the range of from 1:6 to 10:1.

10. The catalyzed soot filter of claim 9, wherein the weight ratio of the sum of the weights of Pt and Pd in the inlet coating to the sum of the weights of Pd and Pt in the outlet coating is in the range of from 1:3 to 1:1.

11. The catalyzed soot filter of claim 9, wherein in the inlet coating, the weight ratio of Pt:Pd is 1:0 and the concentration of Pt is in the range of from 0.5 to 1 g/ft³ (g/(30.48 cm)³), and wherein in the outlet coating, the weight ratio of Pt:Pd is 0:1 and the concentration of Pd is in the range of from 0.5 to 3 g/ft (g/(30.48 cm)³).

12. The catalyzed soot filter of claim 9, wherein the weight ratio of the sum of the weights of Pt and Pd in the inlet coating to the sum of the weight of Pd and Pt in the outlet coating is in the range of from 5:1 to 8:1.

13. The catalyzed soot filter of claim 12, wherein in the inlet coating, the weight ratio of Pt:Pd is in the range of from 1:0 to 0:4, and the concentration of Pt is in the range of from 15 to 40 g/ft³ (g/(30.48 cm)³), and wherein in the outlet coating, the weight ratio of Pt:Pd 0:1, and the concentration of Pd is in the range of from 4 to 6 g/ft³ (g/(30.48 cm)³).

14. The catalyzed soot filter of claim 1, wherein the inlet coating and the outlet coating comprise at least one porous support material, wherein the at least one porous support material of the inlet coating is selected from the group consisting of $Al_2O_3$, $ZrO_2$, $CeO_2$, $SiO_2$ and a mixture of two or more thereof, and wherein the at least one porous support material of the outlet coating selected from the group consisting of $Al_2O_3$, $ZrO_2$, $CeO_2$, $SiO_2$ and a mixture of two or more thereof.

15. The catalyzed soot filter of claim 14, wherein the support material of the inlet coating is $Al_2O_3$, and wherein the support material of the outlet coating is gamma $Al_2O_3$.

16. The catalyzed soot filter of claim 1, wherein the wall flow substrate has a porosity in the range of from 38 to 75, determined according to mercury porosity measurement according to DIN 66133, wherein the wall flow substrate is specifically a cordierite substrate or a silicon carbide substrate.

17. The catalyzed soot filter of claim 1, wherein the inlet coating comprises an oxidation catalyst comprising Pt and Pd.

18. The catalyzed soot filter of claim 1, wherein the outlet coating comprises an oxidation catalyst comprising Pd and Pt.

19. A system for treating a diesel engine exhaust stream comprising the catalyzed soot filter of claim 1, the system further comprising an exhaust conduit in fluid communication with the diesel engine via an exhaust manifold, and further comprising one or more of the following in fluid communication with the catalyzed soot filter: a diesel oxidation catalyst (DOC), a selective catalytic reduction (SCR) article, an NOx storage and reduction (NSR) catalytic article.

20. The system of claim 19, wherein the catalyzed soot filter is dowstream of the DOC.

21. A method of treating diesel engine exhaust stream, the exhaust stream containing soot particles, said method contacting the exhaust stream with the catalyzed soot filter of claim 1.

22. The method of claim 21, wherein the exhaust stream is contacted with the catalyzed soot filter after having directed the exhaust stream through a diesel oxidation catalyst (DOC).

23. The method of claim 22, further comprising directing the exhaust stream resulting from the DOC or from the catalyzed soot filter through a selective catalytic reduction (SCR) article.

24. A process for manufacturing a catalyzed soot filter of claim 1, comprising (i) providing a wall flow substrate, wherein the wall flow substrate, said wall flow substrate comprising an inlet end, and outlet end, a substrate axial length extending between the inlet end and the outlet end, and a plurality of passages defined by the internal walls of the wall flow substrate; wherein the plurality of passages comprise inlet passages having an open inlet end and a closed outlet end, and outlet passages having a closed inlet end and an open outlet end; (ii) applying an inlet coating to the internal walls of the inlet passages such that the inlet coating extends from the inlet end to an inlet coating end whereby an inlet coating length is defined, wherein the inlet coating length is x % of the substrate axial length with $0<x\leq 80$, thereby adjusting the loading of the inlet coating to a predetermined value, said inlet coating comprising an oxidation catalyst comprising platinum (Pt); (iii) before (ii) or simultaneously with (ii) or after (iii), applying an outlet coating to the internal walls of the outlet passages such that the outlet coating extends from the outlet end to an outlet coating end whereby an outlet coating length is defined, wherein the outlet coating length is 100-x % of the substrate axial length, thereby adjusting the loading of the outlet coating to a predetermined value such that the inlet coating and the outlet coating are present on the wall flow substrate at a coating loading ratio in the range of from 0.5:1 to 1.5:1, calculated as ratio of the loading of the inlet coating (in g/inch$^3$ (g/(2.54 cm)3)):loading of the outlet coating (in g/inch$^3$ (g/(2.54 cm)$^3$)), said outlet coating comprising an oxidation catalyst comprising Pd, wherein the Pt concentration in the outlet coating is lower than the Pt concentration in the inlet coating and wherein the weight ratio of Pt:Pd in the outlet coating is in the range of from 0:1 to 2:1.

* * * * *